US010508157B2

(12) United States Patent
Lee et al.

(10) Patent No.: US 10,508,157 B2
(45) Date of Patent: Dec. 17, 2019

(54) MODIFIED AND CONJUGATED DIENE-BASED POLYMER, METHOD FOR PREPARING THE SAME, AND MODIFIER

(71) Applicant: LG Chem, Ltd., Seoul (KR)

(72) Inventors: Sang Mi Lee, Daejeon (KR); Jin Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 7 days.

(21) Appl. No.: 15/738,002

(22) PCT Filed: Dec. 21, 2016

(86) PCT No.: PCT/KR2016/015018
§ 371 (c)(1),
(2) Date: Dec. 19, 2017

(87) PCT Pub. No.: WO2017/111463
PCT Pub. Date: Jun. 29, 2017

(65) Prior Publication Data
US 2018/0305470 A1    Oct. 25, 2018

(30) Foreign Application Priority Data

Dec. 24, 2015 (KR) .................. 10-2015-0186335
Dec. 16, 2016 (KR) .................. 10-2016-0172835

(51) Int. Cl.
| | | |
|---|---|---|
| C08C 19/22 | (2006.01) | |
| C08F 36/06 | (2006.01) | |
| C08C 19/25 | (2006.01) | |
| C08C 19/44 | (2006.01) | |
| C08L 9/00 | (2006.01) | |
| C08C 19/42 | (2006.01) | |
| C08K 3/36 | (2006.01) | |
| C08K 5/56 | (2006.01) | |
| C09D 121/00 | (2006.01) | |
| B60C 1/00 | (2006.01) | |

(52) U.S. Cl.
CPC ............... *C08C 19/22* (2013.01); *B60C 1/00* (2013.01); *C08C 19/25* (2013.01); *C08C 19/42* (2013.01); *C08C 19/44* (2013.01); *C08F 36/06* (2013.01); *C08K 3/36* (2013.01); *C08K 5/56* (2013.01); *C08L 9/00* (2013.01); *C09D 121/00* (2013.01)

(58) Field of Classification Search
CPC ... C08F 8/30; C08F 8/42; C08C 19/22; C08C 19/25; C08C 19/44
See application file for complete search history.

(56) References Cited

U.S. PATENT DOCUMENTS

| | | | |
|---|---|---|---|
| 4,397,994 A | 8/1983 | Takeuchi et al. | |
| 7,053,233 B2 * | 5/2006 | Tonomura | C07F 7/1804 |
| | | | 556/413 |
| 7,342,070 B2 * | 3/2008 | Tsukimawashi | B60C 1/00 |
| | | | 525/105 |
| 9,834,620 B2 * | 12/2017 | Lee | B60C 1/00 |
| 2009/0163668 A1 * | 6/2009 | Yamada | C08C 19/44 |
| | | | 525/331.9 |
| 2009/0203843 A1 | 8/2009 | Fukuoka et al. | |
| 2010/0152369 A1 | 6/2010 | Shibata et al. | |
| 2012/0277369 A1 | 11/2012 | Yoshida et al. | |
| 2013/0296481 A1 | 11/2013 | Tanaka | |
| 2014/0309363 A1 | 10/2014 | Morita et al. | |
| 2016/0177011 A1 | 6/2016 | Kim et al. | |
| 2018/0282353 A1 | 10/2018 | Lim et al. | |

FOREIGN PATENT DOCUMENTS

| | | | | |
|---|---|---|---|---|
| EP | 2338919 A1 | 6/2011 | | |
| EP | 2581391 A1 | 4/2013 | | |
| EP | 2674455 A1 | 12/2013 | | |
| EP | 2676994 A1 | 12/2013 | | |
| EP | 2957572 A1 | 12/2015 | | |
| JP | 2004018795 A | * | 1/2004 | |
| JP | 2005298428 A | * | 10/2005 | ............... C07F 7/10 |
| JP | 2010270212 A | | 12/2010 | |
| JP | 2011121906 A | * | 6/2011 | |
| JP | 2011121906 A | | 6/2011 | |
| JP | 2016525626 A | | 8/2016 | |
| JP | 2018530604 A | | 10/2018 | |

(Continued)

OTHER PUBLICATIONS

Derwent Abstract of JP 2004-018795 (Acc. No. 2003-381607, 2017, 10 pages).*
Derwent Abstract of JP 2005-298428 (Acc. No. 2005-745300, 2010, 4 pages).*
Machine translated English language equivalent of JP 2011-121906 (2011, 4 pages).*
Human translation of para. 6 of JP 2011-121906 (1 page, 2019).*
Extended European Search Report for Application No. 16879330.5 dated Jun. 8, 2018.
International Search Report From PCT/KR2016/015018 dated Mar. 31, 2017.

*Primary Examiner* — Brieann R Johnston
(74) *Attorney, Agent, or Firm* — Lerner, David, Littenberg, Krumholz & Mentlik, LLP

(57) ABSTRACT

The present invention relates to a rubber modifier, a conjugated diene-based polymer including a functional group derived from the modifier, and a method for preparing a modified and conjugated diene-based polymer using the modifier. The modifier is used as the modifier of a conjugated diene-based polymer and combined with a conjugated diene-based polymer chain to easily introduce a functional group having affinity with a filler. Accordingly, a modified and conjugated diene-based polymer prepared using a compound of the rubber modifier may have excellent affinity with a filler, and as a result, molded articles (for example, tires) manufactured from a rubber composition including the polymer may have excellent tensile strength, abrasion resistance, and wet traction.

16 Claims, No Drawings

(56) References Cited

FOREIGN PATENT DOCUMENTS

| | | |
|---|---|---|
| KR | 20090008478 A | 1/2009 |
| KR | 20090122473 A | 11/2009 |
| KR | 10-1413791 B1 | 6/2014 |
| WO | 2008013090 A1 | 1/2008 |
| WO | 2011040312 A1 | 4/2011 |
| WO | 2013031852 A1 | 3/2013 |
| WO | 2015056898 A1 | 4/2015 |
| WO | 2016076549 A1 | 5/2016 |

* cited by examiner

MODIFIED AND CONJUGATED DIENE-BASED POLYMER, METHOD FOR PREPARING THE SAME, AND MODIFIER

CROSS-REFERENCE TO RELATED APPLICATIONS

This application is a national phase entry under 35 U.S.C. § 371 of International Application No. PCT/KR2016/015018, filed Dec. 21, 2016, which claims priority to Korean Patent Application Nos. 10-2015-0186335, filed Dec. 24, 2015, and Korean Patent Application No. -10-2016-0172835, filed en-Dec. 16, 2016, the disclosures of which are incorporated herein by reference.

TECHNICAL FIELD

The present invention relates to a rubber modifier, a conjugated diene-based polymer including a functional group which is derived from the modifier, a method for preparing a modified and conjugated diene-based polymer using the modifier, a rubber composition including the modified and conjugated diene-based polymer, and a tire manufactured from the rubber composition.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for a tire.

In order to reduce the rolling resistance of a tire, there is a method of reducing hysteresis loss of a vulcanized rubber, and rebound resilience at 50° C. to 80° C., tan δ, or the like is used as an evaluation index of the vulcanized rubber. That is, it is desirable to use a rubber material having high rebound resilience at the above temperature or a low tan δ value.

Natural rubber, polyisoprene rubber, or polybutadiene rubber is known as a rubber material having low hysteresis loss, but these rubbers have a limitation of low wet skid resistance. Thus, recently, a conjugated diene-based (co) polymer, such as styrene-butadiene rubber (hereinafter, referred to as "SBR") and butadiene rubber (hereinafter, referred to as "BR"), is prepared by emulsion polymerization or solution polymerization to be used as rubber for a tire. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for a tire because it is easy to change a structure of the finally prepared SBR or BR, and movement of chain terminals may be reduced and a coupling force with a filler, such as silica and carbon black, may be increased by coupling or modification of the chain terminals.

In a case where the solution-polymerized SBR is used as the rubber material for a tire, since a glass transition temperature of the rubber is increased by increasing the vinyl content in the SBR, physical properties, such as running resistance and braking force, required for a tire may not only be controlled, but fuel consumption may also be reduced by appropriately adjusting the glass transition temperature.

The solution-polymerized SBR is prepared by using an anionic polymerization initiator, and is being used by coupling or modification of chain terminals of the polymer thus formed using various modifiers.

For example, U.S. Pat. No. 4,397,994 discloses a method of coupling active anions of the chain terminals of a polymer obtained by polymerizing styrene-butadiene using alkyl-lithium which is a monofunctional initiator in a non-polar solvent, using a binder such as a tin compound.

Meanwhile, carbon black and silica are being used as a reinforcing filler of a tire tread, wherein, in a case where the silica is used as the reinforcing filler, the hysteresis loss may be low and the wet skid resistance may be improved. However, since the silica having a hydrophilic surface has a low affinity with the rubber in comparison to the carbon black having a hydrophobic surface, dispersibility may be poor, and, thus, there is a need to use a separate silane coupling agent to improve the dispersibility or provide coupling between the silica and the rubber.

Therefore, a method of introducing a functional group having an affinity or reactivity with the silica into the terminals of rubber molecules is being performed, but its effect is insufficient.

Accordingly, the development of rubber having high affinity with a filler such as silica is required.

DISCLOSURE OF THE INVENTION

Technical Problem

The present invention has been devised in consideration of the above-mentioned problems, and the object of the present invention is to provide a modified and conjugated diene-based polymer including a functional group derived from a modifier represented by Formula 1, which has a functional group having affinity with a filler, particularly, a silica-based filler.

Another object of the present invention is to provide a method for preparing a modified and conjugated diene-based polymer using the modifier.

Still another object of the present invention is to provide a modifier represented by Formula 1, which is capable of providing a functional group having affinity with a filler, particularly, a silica-based filler.

In addition, still another object of the present invention is to provide a rubber composition including the modified and conjugated diene-based polymer.

Further, still another object of the present invention is to provide a tire manufactured using the rubber composition.

Technical Solution

To solve the above-described tasks, the present invention provides a modified and conjugated diene-based polymer including a functional group derived from a modifier represented by the following Formula 1:

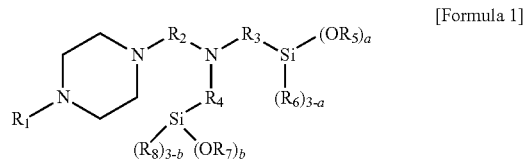

[Formula 1]

in Formula 1,
$R_1$ is $C_{1-10}$alkyl, —$SiR_{12}R_{13}R_{14}$, or —$R_{15}A$,
$R_2$ to $R_4$ are each independently $C_{1-10}$alkylene,
$R_5$ to $R_8$ are each independently $C_{1-10}$alkyl,
a and b are each independently an integer of 1 to 3,
where $R_{12}$ to $R_{14}$ are each independently $C_{1-10}$alkyl, or $C_{1-10}$alkoxy,
$R_{15}$ is $C_{1-10}$alkylene, and
A is a substituent represented by the following Formula 2:

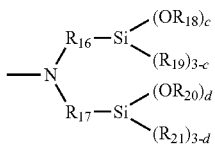

[Formula 2]

in Formula 2,
$R_{16}$ and $R_{17}$ are each independently $C_{1-10}$alkylene,
$R_{18}$ to $R_{21}$ are each independently $C_{1-10}$alkyl, and
c and d are each independently an integer of 1 to 3.

In addition, there is provided a method for preparing the modified and conjugated diene-based polymer including polymerizing conjugated diene-based monomers, or aromatic vinyl-based monomers and conjugated diene-based monomers in the presence of an organo-alkali metal compound in a hydrocarbon solvent to prepare an active polymer in which an alkali metal is combined with at least one terminal thereof (step 1); and reacting the active polymer with a modifier represented by the following Formula 1 (step 2).

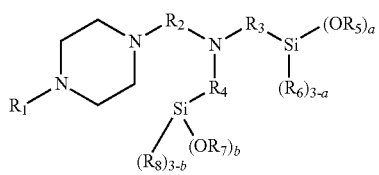

[Formula 1]

in Formula 1,
$R_1$ is $C_{1-10}$alkyl, —$SiR_{12}R_{13}R_{14}$, or —$R_{15}A$,
$R_2$ to $R_4$ are each independently $C_{1-10}$alkylene,
$R_5$ to $R_8$ are each independently $C_{1-10}$alkyl,
a and b are each independently an integer of 1 to 3,
where $R_{12}$ to $R_{14}$ are each independently $C_{1-10}$alkyl, or $C_{1-10}$alkoxy,
$R_{15}$ is $C_{1-10}$alkylene, and
A is a substituent represented by the following Formula 2:

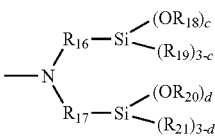

[Formula 2]

in Formula 2,
$R_{16}$ and $R_{17}$ are each independently $C_{1-10}$alkylene,
$R_{18}$ to $R_{21}$ are each independently $C_{1-10}$alkyl, and
c and d are each independently an integer of 1 to 3.
In addition, there is provided a modifier represented by the following Formula 1.

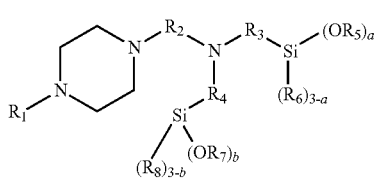

[Formula 1]

in Formula 1,
$R_1$ is $C_{1-10}$alkyl, —$SiR_{12}R_{13}R_{14}$, or —$R_{15}A$,
$R_2$ to $R_4$ are each independently $C_{1-10}$alkylene,
$R_5$ to $R_8$ are each independently $C_{1-10}$alkyl,
a and b are each independently an integer of 1 to 3,
where $R_{12}$ to $R_{14}$ are each independently $C_{1-10}$alkyl, or $C_{1-10}$alkoxy,
$R_{15}$ is $C_{1-10}$alkylene, and
A is a substituent represented by the following Formula 2:

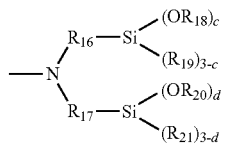

[Formula 2]

in Formula 2,
$R_{16}$ and $R_{17}$ are each independently $C_{1-10}$alkylene,
$R_{18}$ to $R_{21}$ are each independently $C_{1-10}$alkyl, and
c and d are each independently an integer of 1 to 3.

Further, the present invention provides a rubber composition including the modified and conjugated diene-based polymer, and a tire manufactured from the rubber composition.

Advantageous Effects

In the modified and conjugated diene-based polymer according to the present invention, a functional group derived from a modifier represented by Formula 1, for example, a siloxane group and an amine group, is combined with a polymer chain, and affinity with a filler, particularly, a silica-based filler may be excellent.

In addition, according to the preparation method of the present invention, a modified and conjugated diene-based polymer having good modification ratio may be easily prepared by using the modifier represented by Formula 1.

In addition, since the modifier represented by Formula 1 according to the present invention is used as a modifier of a conjugated diene-based polymer, and is combined with a conjugated diene-based polymer chain, a functional group having affinity with a filler may be easily introduced.

Also, since the rubber composition according to the present invention includes a modified and conjugated diene-based polymer having excellent affinity with a filler, the processability thereof may be excellent, and as a result, molded articles (for example, tires) manufactured using the rubber composition may have excellent tensile strength and wet traction.

BEST MODE FOR CARRYING OUT THE INVENTION

Hereinafter, the present invention will now be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The present invention provides a modified and conjugated diene-based polymer including a functional group derived from a modifier represented by the following Formula 1.

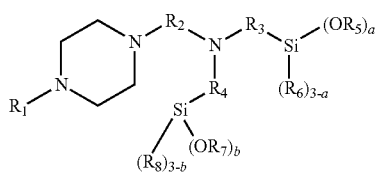

[Formula 1]

in Formula 1,
$R_1$ is $C_{1-10}$alkyl, —$SiR_{12}R_{13}R_{14}$, or —$R_{15}A$,
$R_2$ to $R_4$ are each independently $C_{1-10}$alkylene,
$R_5$ to $R_8$ are each independently $C_{1-10}$alkyl,
a and b are each independently an integer of 1 to 3,
where $R_{12}$ to $R_{14}$ are each independently $C_{1-10}$alkyl, or $C_{1-10}$alkoxy,
$R_{15}$ is $C_{1-10}$alkylene, and
A is a substituent represented by the following Formula 2:

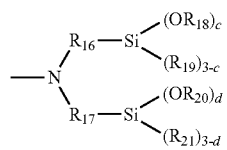

[Formula 2]

in Formula 2,
$R_{16}$ and $R_{17}$ are each independently $C_{1-10}$alkylene,
$R_{18}$ to $R_{21}$ are each independently $C_{1-10}$alkyl, and
c and d are each independently an integer of 1 to 3.

The modified and conjugated diene-based polymer according to an embodiment of the present invention may include a functional group derived from a modifier represented by the above Formula 1. That is, the modified and conjugated diene-based polymer may be modified by a modifier represented by Formula 1.

In the modified and conjugated diene-based polymer, a siloxane group and an amine group are combined with a polymer chain, and affinity with a filler, particularly, a silica-based filler may be excellent. Accordingly, compounding properties with the filler may be excellent, and the processability of a rubber composition including the modified and conjugated diene-based polymer may be excellent, and as a result, molded articles, for example, tires manufactured using the rubber composition may have improved tensile strength, abrasion resistance, and wet traction.

In particular, the modifier may be Formula 1, in which $R_1$ is $C_{1-6}$alkyl, or —$SiR_{12}R_{13}R_{14}$, where $R_{12}$ to $R_{14}$ are each independently $C_{1-6}$alkyl, or $C_{1-6}$alkoxy, $R_2$, $R_3$, and $R_4$ are $C_{1-6}$ alkylene, $R_5$ to $R_8$ are each independently $C_{1-6}$alkyl, and a and b are each independently an integer of 1 to 3.

In addition, the modifier according to an embodiment of the present invention may be Formula 1, in which $R_1$ is —$R_{15}$A, $R_2$ to $R_4$ are each independently $C_{1-6}$alkylene, $R_5$ to $R_8$ are each independently $C_{1-6}$alkyl, a and b are each independently an integer of 1 to 3, where A is represented by Formula 2, and in Formula 2, $R_{15}$ to $R_{17}$ may be each independently $C_{1-6}$alkylene, $R_{13}$ to $R_{21}$ may be each independently $C_{1-6}$alkyl, and c and d may be each independently an integer of 1 to 3.

More particularly, the modifier represented by Formula 1 may be at least one selected from the group consisting of the modifiers represented by the following Formulae 3 to 5.

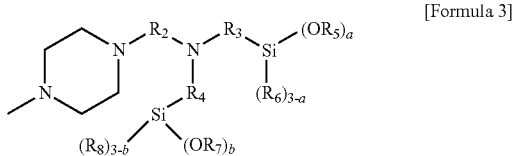

[Formula 3]

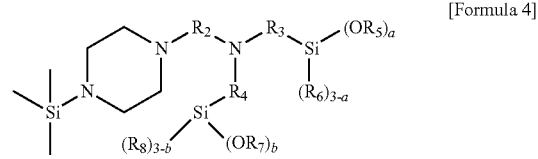

[Formula 4]

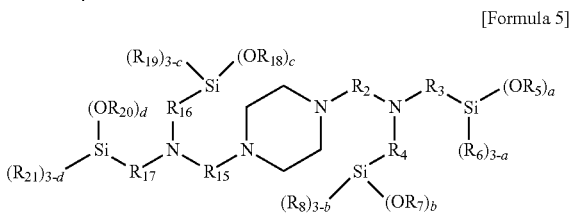

[Formula 5]

in Formula 3 to Formula 5,
$R_2$ to $R_4$, and $R_{15}$ to $R_1$, may be each independently $C_{1-3}$alkylene,
$R_5$ to $R_8$, and $R_{18}$ to $R_{21}$ may be each independently $C_{1-3}$alkyl, and a and b may be each independently an integer of 1 to 3.

In addition, the modified and conjugated diene-based polymer including the functional group derived from the modifier represented by Formula 1 may have a structure selected from the polymers represented by the following Formula 6 to Formula 8.

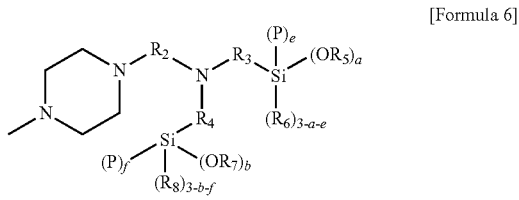

[Formula 6]

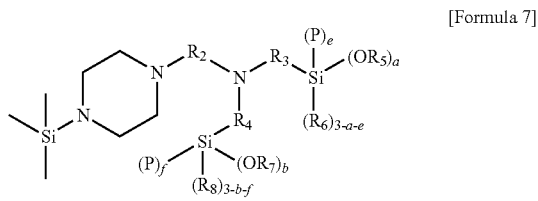

[Formula 7]

in Formula 6 and Formula 7,
$R_2$ to $R_4$ are each independently $C_{1-3}$alkylene,
$R_5$ to $R_8$ are each independently $C_{1-3}$alkyl,
P is a polymer chain, and a, b, e and f are each independently an integer of 0 to 3, where e+f is an integer of 1 to 6.

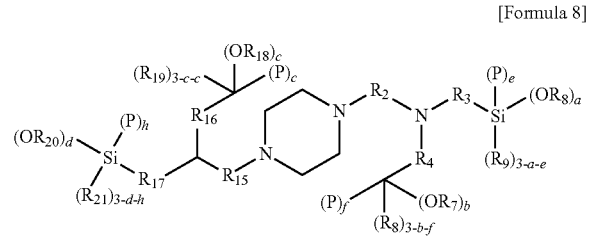
[Formula 8]

in Formula 8, $R_2$ to $R_4$, and $R_{15}$ to $R_{17}$ are each independently $C_{1-3}$alkylene, $R_5$ to $R_8$, and $R_{18}$ to $R_{21}$ are each independently $C_{1-3}$alkyl, P is a polymer chain, and a to h are each independently an integer of 0 to 3, where e+f+g+h is an integer of 1 to 12.

Meanwhile, the modified and conjugated diene-based polymer according to an embodiment of the present invention may be a homopolymer or a copolymer, and may be prepared by the subsequently described preparation method.

Particularly, in the case where the modified and conjugated diene-based polymer is a homopolymer, the modified and conjugated diene-based polymer may be a modified and conjugated diene polymer, and in the case where the modified and conjugated diene-based polymer is a copolymer, the modified and conjugated diene-based polymer may include conjugated diene-based monomer derived units and aromatic vinyl-based monomer derived units. In addition, in the case where the modified and conjugated diene-based polymer is a copolymer, the copolymer may be a random copolymer.

Here, the expression "random copolymer" in the present disclosure may denote that constituent units of the copolymer are disorderly arranged.

In addition, the modified and conjugated diene-based polymer may have a number average molecular weight of 1,000 g/mol to 2,000,000 g/mol, particularly, 10,000 g/mol to 1,000,000 g/mol, and more particularly, 100,000 g/mol to 1,000,000 g/mol.

The modified and conjugated diene-based polymer may have a weight average molecular weight of 10,000 g/mol to 3,000,000 g/mol, and particularly, 100,000 g/mol to 2,000,000 g/mol.

The modified and conjugated diene-based polymer may have a polydispersity of 0.5 to 10, and particularly, 1 to 4.

In addition, the modified and conjugated diene-based polymer may have the vinyl content of 5 wt % or more, particularly, 10 wt % or more, and more particularly, 10 wt % to 60 wt %. If the vinyl content is in the range, a glass transition temperature may be controlled in an appropriate range, and when the modified and conjugated diene-based polymer is applied to a tire, physical properties required for a tire such as running resistance and braking force may be excellent, and reducing effect of fuel consumption may be attained.

In this case, the vinyl content denotes the content of not a 1,4-added but 1,2-added conjugated diene-based monomers based on 100 wt % of a conjugated diene-based polymer composed of monomers having a vinyl group and conjugated diene-based monomers.

In addition, concerning the viscoelasticity properties of the modified and conjugated diene-based polymer when measured after compounding with silica via DMA with 10 Hz, Tan δ at 0° C. may be 0.4 to 1, and particularly, may be 0.5 to 1. Within the range, surface traction or wet traction may be largely improved when compared to the conventional conjugated diene-based polymer.

In addition, Tan δ at 60° C. may be 0.3 to 0.2, or 0.15 to 0.1. Within the range, rolling resistance or rotational resistance (RR) may be largely improved when compared to the conventional conjugated diene-based polymer.

In addition, the present invention provides a method for preparing a modified and conjugated diene-based polymer using a modifier represented by Formula 1.

The preparation method according to an embodiment of the present invention is characterized in including, polymerizing conjugated diene-based monomers, or aromatic vinyl-based monomers and conjugated diene-based monomers in the presence of an organo-alkali metal compound in a hydrocarbon solvent to prepare an active polymer in which an alkali metal is combined with at least one terminal thereof (step 1); and reacting the active polymer with a modifier represented by the following Formula 1 (step 2).

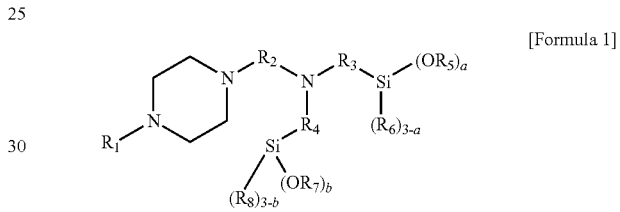
[Formula 1]

in Formula 1, $R_1$ is $C_{1-10}$alkyl, —$SiR_{12}R_{13}R_{14}$, or —$R_{15}A$, $R_2$ to $R_4$ are each independently $C_{1-10}$alkylene, $R_5$ to $R_8$ are each independently $C_{1-10}$alkyl, a and b are each independently an integer of 1 to 3, where $R_{12}$ to $R_{14}$ are each independently $C_{1-10}$alkyl, or $C_{1-10}$alkoxy, $R_{15}$ is $C_{1-10}$alkylene, and A is a substituent represented by the following Formula 2:

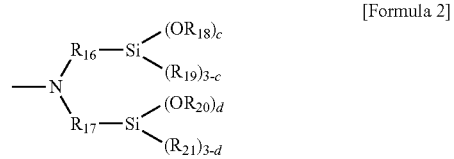
[Formula 2]

in Formula 2, $R_{16}$ and $R_{17}$ are each independently $C_{1-10}$alkylene, $R_{18}$ to $R_{21}$ are each independently $C_{1-10}$alkyl, and c and d are each independently an integer of 1 to 3.

The particular modifier represented by the above Formula 1 is the same as described above.

Step 1 is a step for preparing an active polymer in which an alkali metal is combined with at least one terminal thereof, and is performed by polymerizing conjugated diene-based monomers, or conjugated diene-based monomers and aromatic vinyl-based monomers in the presence of an organo-alkali metal compound in a hydrocarbon solvent.

In the polymerization of step 1, conjugated diene-based monomers alone, or both conjugated diene-based monomers and aromatic vinyl-based monomers may be used as monomers. That is, the polymer prepared through the preparation method according to an embodiment of the present invention may be a conjugated diene-based monomer derived homopolymer, or a copolymer derived from conjugated diene-based monomers and aromatic vinyl-based monomers. In addition, in the case where the conjugated diene-based polymer is a copolymer, the copolymer may be a random copolymer as described above.

The conjugated diene-based monomer may be, for example, at least one selected from the group consisting of 1,3-butadiene, 2,3-dimethyl-1,3-butadiene, piperylene, 3-butyl-1,3-octadiene, isoprene, and 2-phenyl-1,3-butadiene, without specific limitation.

In the case where both the conjugated diene-based monomers and the aromatic vinyl-based monomers are used as the monomers, the conjugated diene-based monomers may be used in an amount such that an amount of the conjugated diene-based monomer derived units in a finally prepared modified and conjugated diene-based polymer is 50 wt % or more, particularly, from 50 wt % to 95 wt %, more particularly, from 60 wt % to 95 wt %.

The aromatic vinyl-based monomer may be, for example, at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene, without specific limitation.

In the case where both the conjugated diene-based monomers and the aromatic vinyl-based monomers are used together as the monomers, the aromatic vinyl-based monomers may be used in an amount such that an amount of the aromatic vinyl-based monomer derived units in a finally prepared modified conjugated diene-based polymer is 50 wt % or less, particularly, from 5 wt % to 50 wt %, and more particularly, from 5 wt % to 40 wt %.

Here, the expression "derived unit" may denote a component or structure come from a certain material or may denote the material itself.

The hydrocarbon solvent is not specifically limited and may be, for example, at least one selected from the group consisting of n-pentane, n-hexane, n-heptane, isooctane, cyclohexane, toluene, benzene and xylene.

The organo-alkali metal compound may be used from 0.01 mmol to 10 mmol, particularly, from 0.05 mmol to 5 mmol, more particularly, from 0.1 mmol to 2 mmol, and further more particularly, from 0.1 mmol to 1 mmol based on 100 g of a total amount of the monomers.

The organo-alkali metal compound may be, for example, at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide, without specific limitation.

The polymerization of step 1 may be performed by further adding a polar additive as needed, and the polar additive may be added in an amount of 0.001 parts by weight to 50 parts by weight based on 100 parts by weight of a total amount of the monomers. Particularly, the addition amount may be 0.001 parts by weight to 10 parts by weight, more particularly, 0.005 parts by weight to 1 part by weight, and further more particularly, 0.005 parts by weight to 0.1 parts by weight based on 100 parts by weight of a total amount of the monomers.

The polar additive may be at least one selected from the group consisting of tetrahydrofuran, ditetrahydrofurylpropane, diethyl ether, cycloamyl ether, dipropyl ether, ethylene dimethyl ether, diethyl glycol, dimethyl ether, tertiary butoxyethoxyethane, bis(3-dimethylaminoethyl)ether, (dimethylaminoethyl) ethyl ether, trimethylamine, triethylamine, tripropylamine, and tetramethylethylenediamine.

In the preparation method according to an embodiment of the present invention, when conjugated diene-based monomers and aromatic vinyl-based monomers are copolymerized, the difference of the reaction rates between them may be compensated by the addition of the polar additive, and the formation of a random copolymer may be easily induced.

The polymerization of the step 1 may be an anionic polymerization, and particularly, may be a living anionic polymerization in which an active terminal may be obtained through a propagation reaction by anions.

In addition, the polymerization of the step 1 may be performed by an adiabatic polymerization, or a polymerization at a constant temperature, in addition, may be a batch type polymerization of a continuous polymerization including at least one reactor.

Here, the adiabatic polymerization means a polymerization method including a step of polymerizing using self-generated heat of reaction without applying heat after adding an organo-alkali metal compound. The polymerization at a constant temperature means a polymerization method by which the temperature of a polymer is kept constant by optionally applying heat or taking heat after adding an organo-alkali metal compound.

The polymerization may be performed in a temperature range of $-20°$ C. to $200°$ C., particularly, $0°$ C. to $150°$ C., and more particularly, $10°$ C. to $120°$ C.

The step 2 is a step of reacting the active polymer and the modifier represented by Formula 1 to prepare a modified and conjugated diene-based polymer.

In this case, the modifier represented by Formula 1 may be the same as described above.

The modifier represented by Formula 1 may be used in a ratio of 0.1 moles to 10 moles, and particularly, 0.3 moles to 2 moles based on 1 mole of the organo-alkali metal compound. If the modifier represented by Formula 1 is used in the above-described ratio, modification reaction may be effectively conducted.

The reaction of the step 2 according to an embodiment of the present invention is modification reaction for introducing a functional group to a polymer, and each reaction may be performed in a temperature range of $10°$ C. to $120°$ C. for 1 minute to 5 hours.

The preparation method according to an embodiment of the present invention may further include at least one step of recovering and drying of a solvent and an unreacted monomer after the step 2 if needed.

In addition, the present invention provides a modifier which is capable of providing a functional group having affinity with a reinforcing filler, particularly, a silica-based filler.

The modifier according to an embodiment of the present invention is characterized in being represented by the following Formula 1.

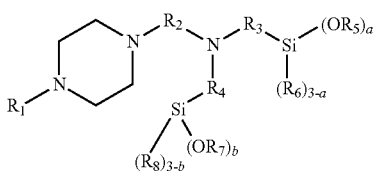

[Formula 1]

in Formula 1,
$R_1$ is $C_{1-10}$alkyl, $—SiR_{12}R_{13}R_{14}$, or $—R_{15}A$,
$R_2$ to $R_4$ are each independently $C_{1-10}$alkylene,
$R_5$ to $R_8$ are each independently $C_{1-10}$alkyl,
a and b are each independently an integer of 1 to 3,
where $R_{12}$ to $R_{14}$ are each independently $C_{1-10}$alkyl, or $C_{1-10}$alkoxy,
$R_{15}$ is $C_{1-10}$alkylene, and
A is a substituent represented by the following Formula 2:

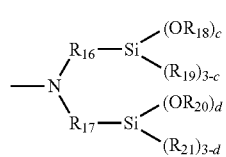

[Formula 2]

in Formula 2,
$R_{16}$ and $R_{17}$ are each independently $C_{1-10}$alkylene,
$R_{18}$ to $R_{21}$ are each independently $C_{1-10}$alkyl, and
c and d are each independently an integer of 1 to 3.

The particular modifier represented by Formula 1 is the same as described above.

The modifier represented by Formula 1 may be a modifier for a conjugated diene-based polymer. Here, the conjugated diene-based polymer may be a conjugated diene-based monomer homopolymer, or a copolymer of a conjugated diene-based monomer and an aromatic vinyl-based monomer.

Further, there is provided in the present invention, a rubber composition including the modified and conjugated diene-based polymer.

The rubber composition according to an embodiment of the present invention may include the modified and conjugated polymer in an amount of 10 wt % or more, particularly 10 wt % to 100 wt %, and more particularly 20 wt % to 90 wt %. If the amount of the modified and conjugated polymer is less than 10 wt %, an effect of improving abrasion resistance and crack resistance of a molded article, for example, a tire, manufactured by using the rubber composition may be insignificant.

In addition, the rubber composition may further include other rubber components, if necessary, in addition to the modified and conjugated diene-based polymer, and, in this case, the rubber component may be included in an amount of 90 wt % or less based on the total weight of the rubber composition. Specifically, the rubber composition may include the modified and conjugated diene-based polymer in an amount of 20 parts by weight to 100 parts by weight and other rubber components in an amount of 0 parts by weight to 80 parts by weight based on 100 parts by weight of the rubber composition.

In addition, the rubber composition according to an embodiment of the present invention may include 10 parts by weight to 100 parts by weight of the modified and conjugated diene-based polymer, 0 parts by weight to 90 parts by weight of other rubber components, 0 parts by weight to 100 parts by weight of carbon black, 5 parts by weight to 200 parts by weight of silica, and 2 parts by weight to 20 parts by weight of a silane coupling agent. In this case, the parts by weight may be represented based on the total amount of 100 parts by weight of the modified and conjugated diene-based polymer with the other rubber components.

In addition, the rubber composition according to another embodiment of the present invention may include 10 wt % to 99 wt % of the modified and conjugated diene-based polymer, and 1 wt % to 90 wt % of the other rubber components, and 1 part by weight to 100 parts by weight of carbon black, 5 parts by weight to 200 parts by weight of silica, and 2 parts by weight to 20 parts by weight of a silane coupling agent based on the total amount of 100 parts by weight of the modified and conjugated diene-based polymer and the other rubber components.

Particularly, the rubber component may be a natural rubber or a synthetic rubber, and the rubber component may be, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene rubber (SBR), polybutadiene (BR), polyisoprene (IR), a butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), a polysulfide rubber, an acryl rubber, a urethane rubber, a silicone rubber, an epichlorohydrin rubber, a butyl rubber, a halogenated butyl rubber, and any one or a mixture of at least two thereof may be used.

In addition, the rubber composition according to an embodiment of the present invention may include 0.1 parts by weight to 200 parts by weight of an inorganic filler based on 100 parts by weight of the modified and conjugated diene-based polymer.

Also, the rubber composition according to another embodiment of the present invention may include 10 parts by weight to 150 parts by weight, particularly, 50 parts by weight to 100 parts by weight of a filler based on 100 parts by weight of the modified and conjugated diene-based polymer, and the filler may be a silica-based filler, a carbon black-based filler, or a combination thereof.

Meanwhile, in the case where a silica-based filler is used as the filler, dispersibility may be largely improved, and hysteresis loss may be largely decreased due to the combination of silica particles of the filler with the terminal of the modified and conjugated diene-based polymer. In addition, in the case where the silica-based filler is used as the filler, a silane coupling agent may be used together in the rubber composition according to an embodiment of the present invention for the improvement of reinforcing and low exothermic properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N- dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of at least two thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, in the rubber composition according to an embodiment of the present invention, a modified and conjugated diene-based polymer in which a functional group having high affinity with a silica-based filler is introduced at an active part as a rubber component is used, and the amount of compounding of the silane coupling agent may be smaller than a common case. In particular, the silane coupling agent may be used in an amount of 1 part by weight to 20 parts by weight based on 100 parts by weight of the silica-based filler. When used in the above range, effects as a coupling agent may be sufficiently exhibited, and the gelation of the rubber component may be prevented. More particularly, the silane coupling agent may be used in an amount of 5 parts by weight to 15 parts by weight based on 100 parts by weight of silica.

In addition, the rubber composition according to an embodiment of the present invention may be sulfur cross-linkable, and so may further include a vulcanizing agent.

The vulcanizing agent may be particularly a sulfur powder and may be included in an amount of 0.1 parts by weight to 10 parts by weight based on 100 parts by weight of a rubber component. With the amount in the above range, elasticity and strength required for a vulcanized rubber composition may be secured, and at the same time, a low fuel combustion ratio may be attained.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator is not specifically limited and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight based on 100 parts by weight of the rubber component.

In addition, the process oil acts as a softener in a rubber composition and may particularly include paraffin-based, naphthene-based, or aromatic compound. More particularly, the aromatic process oil may be used in consideration of tensile strength and abrasion resistance, and the naphthene-based or paraffin-based process oil may be used in consideration of hysteresis loss and low temperature properties. The process oil may be included in an amount of 5 parts by weight to 100 parts by weight, particularly, 20 parts by weight to 80 parts by weight based on 100 parts by weight of the rubber component. With the above-described amount, the deterioration of the tensile strength and the low exothermic properties (low fuel combustion ratio) of the vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low exothermic properties and good abrasion resistance may be obtained due to a vulcanization process after a molding process.

Therefore, the rubber composition may be usefully used for the manufacture of each member of a tire such as a tire tread, an under tread, a side wall, a carcass coating rubber, a belt coating rubber, a bead filler, a chafer, and a bead coating rubber, or for the manufacture of rubber products for various industries such as a dustproof rubber, a belt conveyor, and a hose.

Also, there is provided in the present invention a tire manufactured using the rubber composition.

The tire may include a tire or a tire tread.

Hereinafter, the present invention will be explained in particular referring to non-limiting embodiments. However, the following embodiments and experimental embodiments are only for the illustration of the present invention, and the scope of the present invention is not limited thereto.

Example 1

To a 20 L autoclave reactor, 270 g of styrene, 710 g of 1,3-butadiene, 5,000 g of normal hexane, and 0.86 g of 2,2-di(2-tetrahydrofuryl)propane (DTP) as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes, 20 g of 1,3-butadiene was added for capping the terminal of a polymer with butadiene. After 5 minutes, 4 mmol of 3-(4-methylpiperazin-1-yl)-N,N-bis(3-(triethoxysilyl)propyl)propan-1-amine was injected, and the modification reaction was continued for 15 minutes. After that, a polymerization reaction was quenched using ethanol, and 45 ml of a solution of 0.3 wt % of butylated hydroxytoluene (BHT) as an antioxidant dissolved in hexane was added thereto. The polymer thus obtained was injected to hot water heated with steam, stirred to remove solvents, and roll dried to remove remaining solvents and water to prepare a modified styrene-butadiene copolymer.

Example 2

A modified styrene-butadiene copolymer was prepared by the same method described in Example 1 except for performing a modification reaction using 3-(triethoxysilyl)-N-(3-(triethoxysilyl)propyl)-N-(3-(4-(trimethylsilyl)piperazine-1-yl)propyl)propan-1-amine instead of 3-(4-methylpiperazin-1-yl)-N,N-bis(3-(triethoxysilyl)propyl)propan-1-amine.

Example 3

A modified styrene-butadiene copolymer was prepared by the same method described in Example 1 except for performing a modification reaction using 3,3'-(piperazine-1,4-diyl)bis(N,N-bis(3-(triethoxysilyl)propyl)propan-1-amine instead of 3-(4-methylpiperazin-1-yl)-N,N-bis(3-(triethoxysilyl)propyl)propan-1-amine.

Comparative Example 1

To a 20 L autoclave reactor, 270 g of styrene, 710 g of 1,3-butadiene, 5,000 g of normal hexane, and 0.86 g of 2,2-di(2-tetrahydrofuryl)propane (DTP) as a polar additive were added, and the internal temperature of the reactor was elevated to 40° C. When the internal temperature of the reactor reached 40° C., 4 mmol of n-butyllithium was injected into the reactor, and an adiabatic reaction with heating was performed. After about 20 minutes, 20 g of 1,3-butadiene was added for capping the terminal of a polymer with butadiene. After 5 minutes, 4 mmol of dichlorodimethylsilane was injected, and the reaction was continued further for 15 minutes. After that, a polymerization reaction was quenched using ethanol, and 45 ml of a solution of 0.3 wt % of butylated hydroxytoluene (BHT) as an antioxidant dissolved in hexane was added thereto. The resultant polymer thus obtained was injected to hot water heated with steam, stirred to remove solvents, and roll dried to remove remaining solvents and water to prepare a modified styrene-butadiene copolymer. Here, the dichlorodimethylsialne was used to obtain a styrene-butadiene copolymer having a molecular weight having a similar degree as that of Example 1.

Comparative Example 2

A commercially available styrene-butadiene copolymer (5025-2HM grade, LANXESS Co., Ltd.) was used for experiments.

Experimental Example 1

With respect to each of the copolymers of Examples 1 to 3 and Comparative Examples 1 and 2, the styrene derived unit and the vinyl contents, the weight average molecular weight (Mw), the number average molecular weight (Mn), the polydispersity index (PDI), and the mooney viscosity (MV) were measured. The results are listed in Table 1 below.

1) Analysis of Styrene Derived Unit Content and Vinyl Content

The styrene derived unit (SM) content and the vinyl content in each copolymer were measured by using NMR.

2) Analysis of Molecular Weight

The weight average molecular weight (Mw) and number average molecular weight (Mn) of each copolymer were measured by gel permeation chromatography (GPC) analysis under conditions of 40° C. In this case, two columns of PLgel Olexis and one column of PLgel mixed-C manufactured by Polymer Laboratories Co. Ltd. were used in combination as columns, and newly replaced columns were all mixed bed type columns. In addition, polystyrene (PS) was used as a GPC standard material for calculating the molecular weight. The polydispersity index (PDI) was calculated as a ratio (Mw/Mn) of the weight average molecular weight and the number average molecular weight, which were measured by the above method.

3) Analysis of Mooney Viscosity

Two specimens having a weight of at least 15 g were pre-heated for 1 minute and then heated at 100° C. for 4 minutes, and measurement was conducted using MV-2000 (Alpha Technologies Co., Ltd.).

TABLE 1

| Division | Styrene derived unit (wt %) | Vinyl (wt %) | GPC Mw (g/mol, ×10$^4$) | GPC Mn (g/mol, ×10$^4$) | PDI | Mooney viscosity (MV) |
|---|---|---|---|---|---|---|
| Example 1 | 27 | 43 | 41 | 31 | 1.3 | 70 |
| Example 2 | 27 | 43 | 42 | 32 | 1.3 | 72 |
| Example 3 | 27 | 43 | 55 | 38 | 1.4 | 76 |
| Comparative Example 1 | 27 | 43 | 50 | 31 | 1.2 | 64 |
| Comparative Example 2 | 27 | 43 | 69 | 39 | 1.8 | 61 |

As shown in Table 1, the mooney viscosity of the modified styrene-butadiene copolymers of Examples 1 to 3 according to example embodiments of the present invention was found to increase when compared to the mooney viscosity of the styrene-butadiene copolymers of Comparative Examples 1 and 2.

Particularly, the styrene-butadiene copolymer of Comparative Example 1 was prepared by the same conditions as those for the modified styrene-butadiene copolymers of Examples 1 to 3 except for not performing a modification reaction. From the results in Table 1 in which the mooney viscosity of the modified styrene-butadiene copolymers of Examples 1 to 3 was increased when compared to that of the styrene-butadiene copolymer of Comparative Example 1, the modified styrene-butadiene copolymers of Examples 1 to 3 were found to be modified.

Experimental Example 2

In order to comparatively analyze the physical properties of a rubber composition including each copolymer of Examples 1 to 3 and Comparative Examples 1 and 2 and a molded article manufactured from the rubber composition, tensile properties and viscoelasticity properties were measured. The results are listed in Table 2 below.

1) Preparation of Rubber Composition

Each rubber composition was prepared via a first stage mulling and a second stage mulling. In this case, the amounts used of materials excluding a modified and conjugated diene-based copolymer were indicated based on 100 parts by weight of the modified and conjugated diene-based copolymer. In the first stage mulling, 137.5 parts by weight of each modified and conjugated copolymer, 70 parts by weight of silica, 11.2 parts by weight of bis(3-triethoxysilylpropyl)tetrasulfide as a silane coupling agent, 25 parts by weight of a process oil (TDAE), 2 parts by weight of an antiaging agent (TMDQ), 3 parts by weight of zinc oxide (ZnO), 2 parts by weight of stearic acid, and 1 part by weight of wax were mixed and mulled by using a banbury mixer equipped with a temperature controlling apparatus. In this case, the temperature of the mulling apparatus was controlled, and a first compound mixture was obtained at a discharge temperature of 145° C. to 155° C. At the second stage mulling, the first compound mixture was cooled to room temperature, and 1.75 parts by weight of a rubber accelerator (CZ), 1.5 parts by weight of a sulfur powder, and 2 parts by weight of a vulcanization accelerator were added to the mulling apparatus and mixed at a temperature of 100° C. or less to obtain a second compound mixture. Then, each rubber composition was prepared via a curing process at 100° C. for 20 minutes.

2) Tensile Properties

Tensile properties were measured by manufacturing each specimen and measuring tensile strength when broken and tensile stress when elongated by 300% (300% modulus) of each specimen according to an ASTM 412 tensile test method. Particularly, a Universal Test machine 4204 tensile tester (Instron Co., Ltd.) was used, and measurement was performed at room temperature at a rate of 50 cm/min, to obtain a tensile strength value and a tensile stress value when elongated by 300%.

3) Viscoelasticity Properties

Viscoelasticity properties were measured by using a dynamic mechanical analyzer of TA Co., Ltd. Tan δ was measured by changing deformation at each measurement temperature (−60° C. to 60° C.) with a twist mode and a frequency of 10 Hz, and the result was indexed by setting the measured value of Comparative Example 2 as a standard value. In this case, the indexing was calculated via the following Equation 1 and Equation 2. If the Tan δ at a low temperature of 0° C. is high, wet traction is good, and if the Tan δ at a high temperature of 60° C. is low, hysteresis loss is small, low rolling resistance of a tire (low fuel consumption ratio) is good.

$$\text{Tan}\delta(\text{at } 0°\text{C.}) = \left(\frac{\text{measured value} - \text{standard value}}{\text{standard value}} \times 100\right) + 100 \quad \text{[Equation 1]}$$

$$\text{Tan}\delta(\text{at } 60°\text{C.}) = \left(\frac{\text{standard value} - \text{measured value}}{\text{standard value}} \times 100\right) + 100 \quad \text{[Equation 2]}$$

In Equation 1 and Equation 2, standard value is the measured value of Comparative Example 2, and the measured value is the measured value of examples and comparative examples.

TABLE 2

| Division | | Example 1 | Example 2 | Example 3 | Comparative Example 1 | Comparative Example 2 |
|---|---|---|---|---|---|---|
| Tensile properties | Tensile strength (kgf/cm²) | 183 | 184 | 188 | 168 | 167 |
| | 300% modulus (kgf/cm²) | 118 | 119 | 122 | 104 | 98 |
| Viscoelasticity | Tan δ at 0° C. (Index) | 102 | 102 | 105 | 98 | 100 |
| | Tan δ at 60° C. (Index) | 131 | 133 | 137 | 105 | 100 |

As shown in Table 2, the tensile and viscoelasticity properties of rubber compositions including the modified styrene-butadiene copolymers of Examples 1 to 3, which were prepared using the modifier according to an embodiment of the present invention were found to be better when compared to those of the rubber compositions including the copolymers of Comparative Examples 1 and 2.

In particular, a Tan δ value at 0° C. was increased (index value increase), and a Tan δ value at 60° C. was decreased (index value increase) for the rubber compositions including the modified styrene-butadiene copolymers according to Examples 1 to 3, which were prepared using the modifier according to an embodiment of the present invention when compared to the rubber compositions including the unmodified styrene-butadiene copolymers of Comparative Examples 1 and 2. The results indicate that the modified styrene-butadiene copolymer prepared using the modifier according to an embodiment of the present invention attained good wet traction and rolling resistance, and a low fuel consumption ratio (high fuel efficiency).

The invention claimed is:

1. A modified and conjugated diene-based polymer comprising a functional group derived from a modifier represented by the following Formula (1):

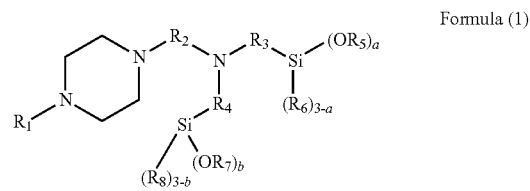

Formula (1)

in Formula (1), $R_1$ is $SiR_{12}R_{13}R_{14}$, or $-R_{15}A$, $R_2$ to $R_4$ are each independently $C_{1-10}$alkylene, $R_5$ to $R_8$ are each independently $C_{1-10}$alkyl, a and b are each independently an integer of 1 to 3, where $R_{12}$ to $R_{14}$ are each independently $C_{1-10}$alkyl, or $C_{1-10}$alkoxy, $R_{15}$ is $C_{1-10}$alkylene, and A is a substituent represented by the following Formula (2):

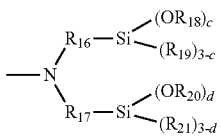

Formula (2)

in Formula (2), $R_{16}$ and $R_{17}$ are each independently $C_{1-10}$alkylene, $R_{18}$ to $R_{21}$ are each independently $C_{1-10}$alkyl, and c and d are each independently an integer of 1 to 3.

2. The modified and conjugated diene-based polymer of claim 1, wherein in Formula (1), $R_1$ is —$SiR_{12}R_{13}R_{14}$, where $R_{12}$ to $R_{14}$ are each independently $C_{1-6}$alkyl, $R_2$ to $R_4$ are each independently $C_{1-6}$alkylene, $R_5$ to $R_8$ are each independently $C_{1-6}$alkyl, and a and b are each independently an integer of 1 to 3.

3. The modified and conjugated diene-based polymer of claim 1, wherein in Formula (1), $R_1$ is —$R_{15}A$, $R_2$ to $R_4$, and $R_{15}$ are each independently $C_{1-6}$alkylene, $R_5$ to $R_8$, are each independently $C_{1-6}$alkyl, a and b are each independently an integer of 1 to 3, A is a substituent represented by Formula (2), wherein in Formula (2), $R_{16}$ and $R_{17}$ are each independently $C_{1-6}$alkylene, $R_{18}$ to $R_{21}$ are each independently $C_{1-6}$alkyl, and c and d are each independently an integer of 1 to 3.

4. The modified and conjugated diene-based polymer of claim 1, wherein the modifier represented by Formula (1) is at least one selected from the group consisting of modifiers represented by the following Formula (4) and Formula (5):

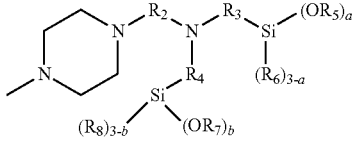

Formula (4)

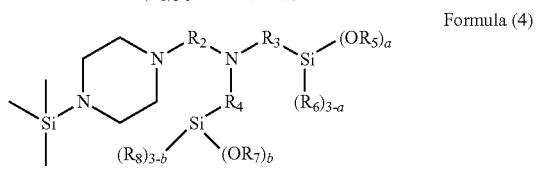

Formula (5)

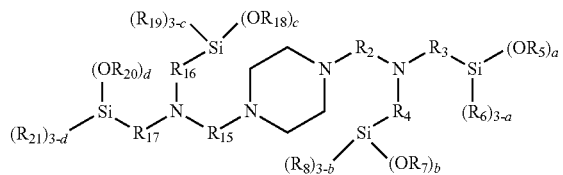

in Formula (4) and Formula (5), $R_2$ to $R_4$, and $R_{15}$ to $R_{17}$ are each independently $C_{1-3}$alkylene, $R_5$ to $R_8$, and $R_{18}$ to $R_{21}$ are each independently $C_{1-3}$alkyl, and a to d are each independently an integer of 1 to 3.

5. The modified and conjugated diene-based polymer of claim 1, wherein the polymer is a conjugated diene-based monomer homopolymer, or a copolymer of a conjugated diene-based monomer and an aromatic vinyl-based monomer.

6. The modified and conjugated diene-based polymer of claim 1, wherein the polymer is selected from polymers represented by the following Formula (7) and Formula (8):

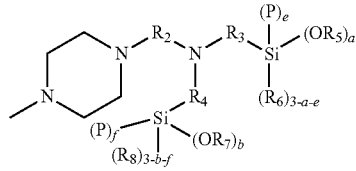

Formula (7)

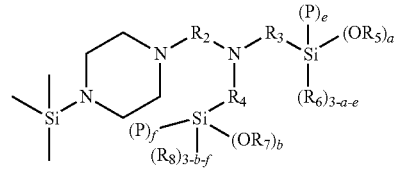

in Formula (7), $R_2$ to $R_4$ are each independently $C_{1-3}$alkylene, $R_5$ to $R_8$ are each independently $C_{1-3}$alkyl, P is a polymer chain, and a, b, e and f are each independently an integer of 0 to 3, where e+f is an integer of 1 to 6:

Formula (8)

in Formula (8), $R_2$ to $R_4$, and $R_{15}$ to $R_{17}$ are each independently $C_{1-3}$alkylene, $R_5$ to $R_8$, and $R_{18}$ to $R_{21}$ are each independently $C_{1-3}$alkyl, P is a polymer chain, and a to h are each independently an integer of 0 to 3, where e+f+g+h is an integer of 1 to 12.

7. The modified and conjugated diene-based polymer of claim 1, wherein a number average molecular weight of the polymer is 1,000 g/mol to 2,000,000 g/mol.

8. The modified and conjugated diene-based polymer of claim 1, wherein the polymer has a polydispersity of 1 to 10.

9. The modified and conjugated diene-based polymer of claim 1, wherein the polymer has a vinyl content of 5 wt % or more.

10. A method for preparing the modified and conjugated diene-based polymer of claim 1, the method comprising:

(1) polymerizing conjugated diene-based monomers, or aromatic vinyl-based monomers and conjugated diene-based monomers in the presence of an organo-alkali metal compound in a hydrocarbon solvent to prepare an active polymer in which an alkali metal is combined with at least one terminal thereof; and (2) reacting the active polymer with a modifier represented by the following Formula (1):

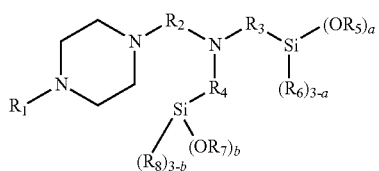

Formula (1)

in Formula (1), $R_1$ is $-SiR_{12}R_{13}R_{14}$, or $-R_{15}A$, $R_2$ to $R_4$ are each independently $C_{1-10}$alkylene, $R_5$ to $R_8$ are each independently $C_{1-10}$alkyl, a and b are each independently an integer of 1 to 3, where $R_{12}$ to $R_{14}$ are each independently $C_{1-10}$alkyl, or $C_{1-10}$alkoxy, $R_{15}$ is $C_{1-10}$alkylene, and A is a substituent represented by the following Formula (2):

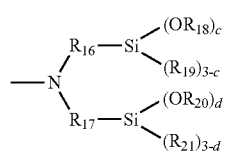

Formula (2)

in Formula (2), $R_{16}$ and $R_{17}$ are each independently $C_{1-10}$alkylene, $R_{18}$ to $R_{21}$ are each independently $C_{1-10}$alkyl, and c and d are each independently an integer of 1 to 3.

11. The method for preparing the modified and conjugated diene-based polymer of claim 10, wherein the organo-alkali metal compound is used in a ratio of 0.01 mmol to 10 mmol based on 100 g of a total amount of the monomers.

12. The method for preparing the modified and conjugated diene-based polymer claim 10, wherein the organo-alkali metal compound is at least one selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

13. The method for preparing the modified and conjugated diene-based polymer of claim 10, wherein the polymerizing of step (1) is performed by further adding a polar additive.

14. The method for preparing the modified and conjugated diene-based polymer of claim 13, wherein the polar additive is added in an amount of 0.001 parts by weight to 50 parts by weight based on 100 parts by weight of a total amount of the monomers.

15. The method for preparing the modified and conjugated diene-based polymer of claim 10, wherein the modifier represented by Formula (1) is at least one selected from the group consisting of modifiers represented by the following Formula (4) and Formula 5:

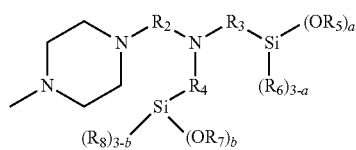

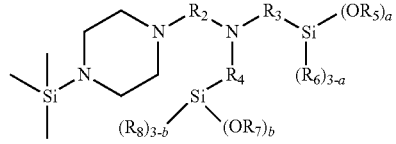

Formula (4)

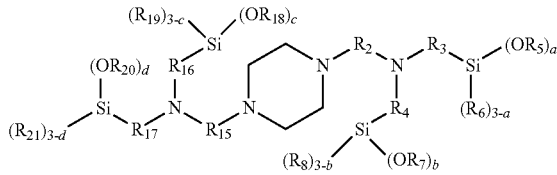

Formula (5)

in Formula (3) and Formula (5), $R_2$ to $R_4$, and $R_{15}$ to $R_{17}$ are each independently $C_{1-3}$alkylene, $R_5$ to $R_8$, and $R_{18}$ to $R_{21}$ are each independently $C_{1-3}$alkyl, and a to d are each independently an integer of 1 to 3.

16. The method for preparing the modified and conjugated diene-based polymer of claim 10, wherein the modifier represented by Formula (1) is used in a ratio of 0.1 to 10 moles based on 1 mole of the organo-alkali metal compound.

* * * * *